E. L. KUNZ.
VEHICLE TOP FRAME.
APPLICATION FILED APR. 29, 1916.

1,233,586.

Patented July 17, 1917.
2 SHEETS—SHEET 1.

INVENTOR
Edward L. Kunz,
by his attorney,
J. Edward Hiband.

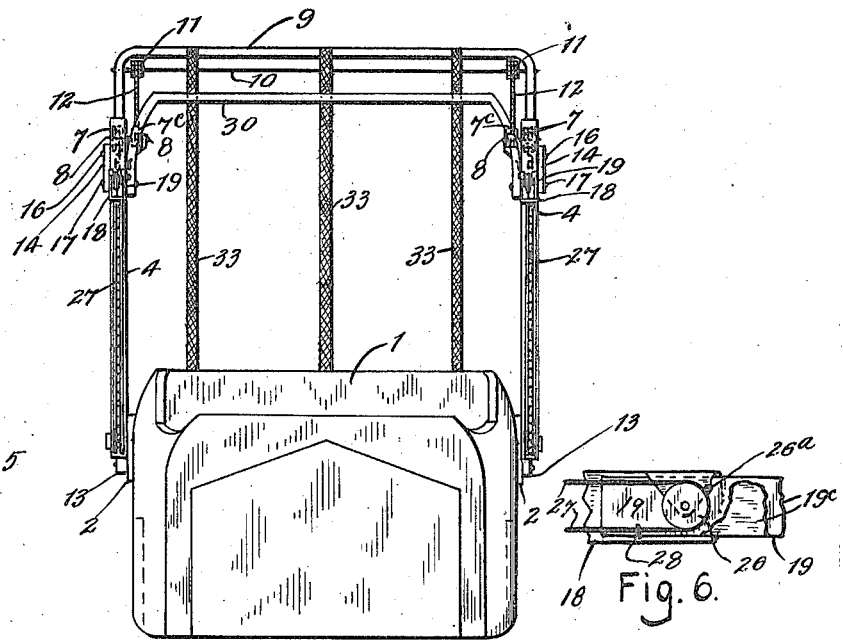
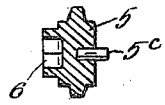
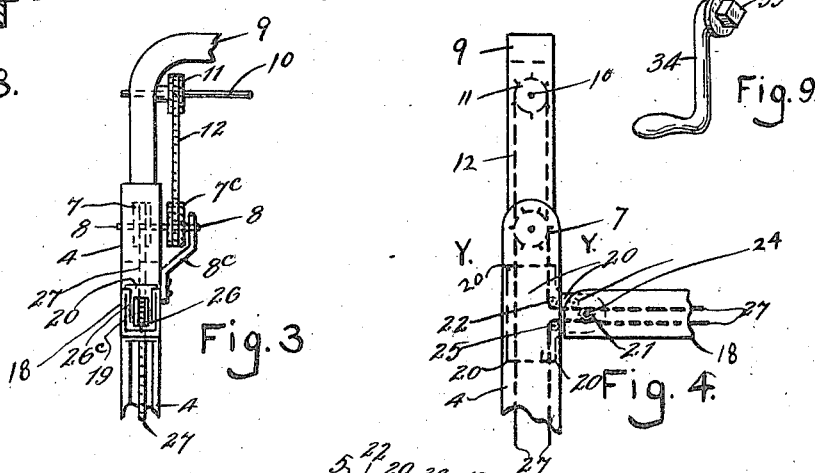
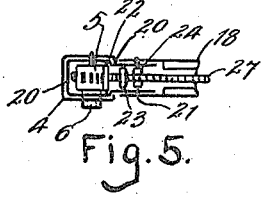

UNITED STATES PATENT OFFICE.

EDWARD L. KUNZ, OF BUFFALO, NEW YORK, ASSIGNOR, BY MESNE ASSIGNMENTS, TO ONE HAND AUTO TOP CO., INC., OF BUFFALO, NEW YORK, A CORPORATION OF NEW YORK.

VEHICLE-TOP FRAME.

1,233,586.  Specification of Letters Patent.  Patented July 17, 1917.

Application filed April 29, 1916. Serial No. 94,491.

*To all whom it may concern:*

Be it known that I, EDWARD L. KUNZ, a citizen of the United States, residing at Buffalo, in the county of Erie and State of New York, have invented certain new and useful Improvements in Vehicle-Top Frames; and I do hereby declare the following to be a full, clear, and exact description of my invention, such as will enable others skilled in the art to which it appertains to make and use the same, reference being had to the accompanying drawings, and to figures of reference marked thereon, which form part of this specification.

Like figures of reference refer to like parts.

This invention relates to vehicle top frames, particularly that kind which can be folded and unfolded by mechanism operated either by a hand crank or by power manually controlled.

The object of this invention is to provide means for moving the frame of a vehicle into an open position from a folded one or vice versa to eliminate the necessity of moving the frame parts into position by hand. Tops of large vehicles are difficult to raise and lower by hand, whereas with proper mechanism, hand power can be applied with much advantage to the operator for the same purpose. A further object is to provide a portable top frame that can be easily applied to an uncovered auto body, one that can be made at one place and shipped any where and be applied by ordinary skilled labor. Another object is to provide a mechanically operated top frame which will be simple in construction, one such as can be manufactured and sold at a popular price at a profit, and at the same time be durable.

To fulfil the above objects, I provide a pivoted frame, having a chain and sprocket wheels so located, with the proper length relations of the links of the frame and the positioning of their pivot points as to render it possible, by the turning of one of the sprocket wheels, to make the said frame links co-act with one another and automatically raise or lower the frame in the desired position.

One form of this invention is illustrated in the figures and hereinafter described, the operation is explained and what I claim is set forth.

In the drawings,

Fig. 2 is a front sectional elevation, taken on the line X—X of Fig. 1.

Fig. 3, is a front elevation of the upper portion of the swinging end of the main link or arm of the frame which carries the upright portion of the operating chain.

Fig. 4, is a side elevation of the portion of the frame shown in Fig. 3.

Fig. 5, is a diagrammatic section taken on the line Y—Y of Fig. 4.

Fig. 6, is an elevation of a fragment of the horizontal frame link, showing the positioning of the idle roller carrying the chain and also shows the connection of the telescoping arm with said chain.

Fig. 7, is an elevation of the lower sprocket wheel having a square socket for engagement with a wrench.

Fig. 8, is a vertical sectional view of the sprocket wheel shown in Fig. 7.

Fig. 9, is a perspective view of a wrench adapted to fit the socket in the lower sprocket wheel in the said frame.

Figure 1:
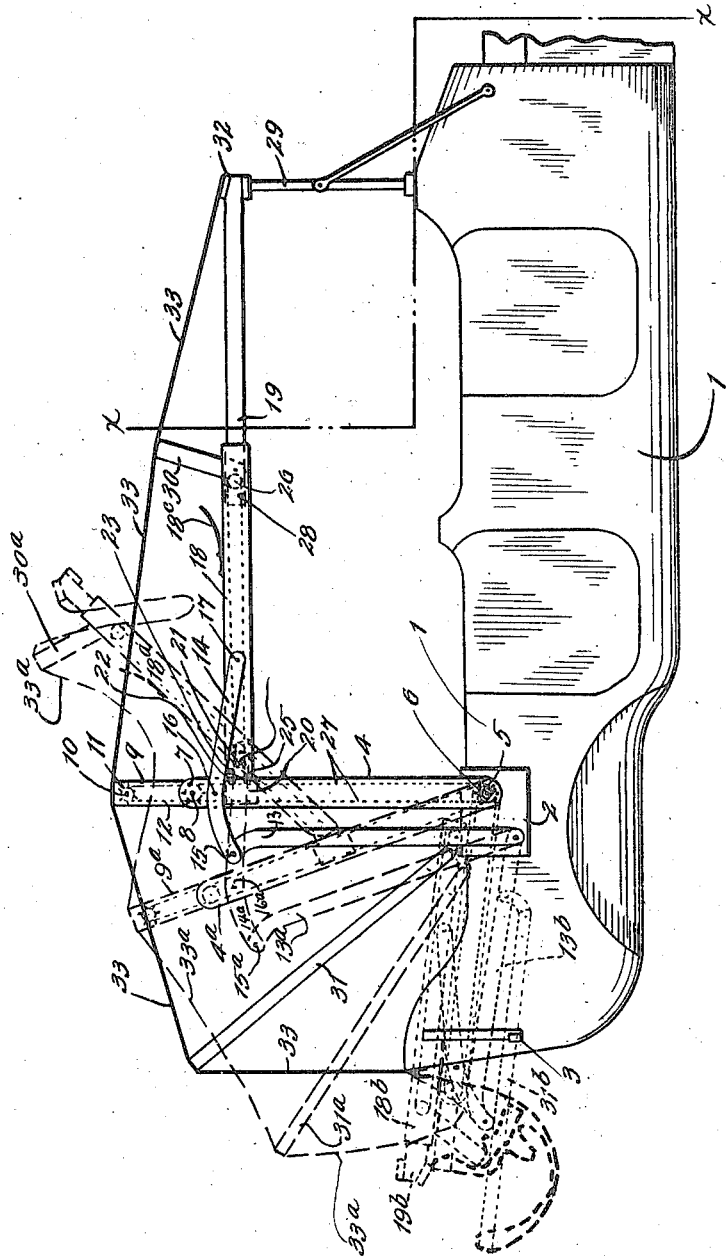
Figure 1 is a side elevation of an auto body, having a top frame, embodying my invention fitted thereto.

In Fig. 1, 1 is the body of an automobile, having attached thereto, a plate 2 and a hook 3. A corresponding plate and hook are attached to the opposite side of the said body 1, in the same relative positions. To the plate 2 is journaled the tubular arm 4. Concentric with the axis of the journaled connection of the arm 4 with the plate 2, is the sprocket wheel 5, journaled within the lower end of the arm 4. The wheel 5 has a protruding boss with a square recess 6, for engagement with a suitable wrench, for turning the same. In the upper end of the arm 4, is another sprocket wheel 7, fixed on a shaft 8 which extends inwardly on the opposite side of the arm 4 and has another sprocket wheel fixed to it, between the arm 4 and a bracket in which the said shaft 8 is journaled. not shown in this figure.

Journaled to a plate on the opposite side of the body 1, similar to plate 2, is an arm similar to the arm 4. Connecting this arm with the arm 4, is an arched rib 9, beneath and in the ends of which, are journaled the ends of a shaft 10. A sprocket wheel 11 is fixed to the shaft 10, near the arm 4, and is connected by a sprocket chain 12, to the wheel behind the wheel 7. Also journaled to the plate 2, is a guiding arm 13, journaled to a lever 14 at the point 15. The lever 14 is also journaled near the top of the arm 4, at the point 16, and at its front end, at the point 17, to the tubular strut 18. 18ᶜ is a separating spring, positioned to contact arm 4. Within the strut 18 is telescopically fitted the channel piece 19.

In sliding engagement with the arm 4, is the bracket 20, protruding forward from the arm 4 and journaled with the strut 18 at the point 21. Within the bracket 20, are journaled four small rollers, marked respectively, 22, 23, 24 and 25, extending across the bracket 20. Journaled within the strut 18, upon depending lips from the sides of the strut 18, is the roller 26. An endless sprocket chain 27, in mesh with the wheels 5 and 7, extends from wheel 5, through the bracket 20, around the wheel 7, under the rollers 22 and 23, within the bracket 20, thence forward and around the roller 26, and back within the bracket 20, under the roller 24 and over the roller 25, thence down and around the sprocket wheel 5; to the place of beginning. Within the strut 18, the chain 27 is anchored to a pin 28, fixed near the inner end of the channel piece 19. The front end of the piece 19 is removably fixed to the wind shield 29. Near the forward end of the strut 18, is pivoted an arched rib 30, extending across the body 1, and also pivoted to a strut similar to the strut 18, there being a similar set of arms, levers and pieces on the opposite side of the body to that shown in the figure.

Pivoted to the guiding arm 13, near its lower end, is a U-shaped rib 31, extending across the body 1, and pivoted to a guiding arm similar to the guiding arm 13. Flexibly connecting the ribs 31, 9 and 30, as well as a cross piece 32, connecting the front ends of the channel pieces, over the wind shield; and fixed upon the body 1, are bands 33, which complete the outer form of the frame carrying a suitable covering.

In the front view, shown in Fig. 2, these bands 33 are clearly shown. The form of the ribs 9 and 30, is shown, as well as the position of the cross shaft 10, the chains 12, and 27, the arms 4, the levers 14 and plates 2 on the body 1.

In Fig. 3, is shown a bracket 8ᶜ, which supports the inside end of the shaft 8, to which it is journaled. The relative positions of the chains 12 and 27 is also shown, whereby the turning of the shaft 8 by the chain 27, is communicated to the cross shaft 10.

In Fig. 4 the position of the bracket 20, in sliding engagement with the arm 4, and journaled at 21 to the strut 18, is clearly shown.

In Fig. 5, the engagement of the sheet metal bracket 20 with the sheet metal arm 4 is illustrated, together with the positions of the rollers 22, 23 and 24.

In Fig. 6, is shown one of two depending lips 26ᵃ, extending down within the strut 18 and integral therewith. To these lips 26ᵃ is journaled the roller 26, around which passes the chain 27. The telescoping of the piece 19, having its upstanding sides 19ᶜ passing beneath the lips 26ᵃ, is illustrated.

In Fig. 7 is plainly shown the square socket 6 in the sprocket wheel 5.

In Fig. 8 is shown a pivot pin 5ᶜ, used in journaling the wheel 5 to the arm 4 and the plate 2.

In Fig. 9, the wrench 34, is shown with a boss 35, adapted to fit the socket 6 in the wheel 5.

In operation, assume that the parts of the frame are as shown in full lines in Fig. 1, upon turning the sprocket wheel 5 clockwise (as the hands of a clock turn), the chain 27 will pull upon the pin 28 and in its continued motion will draw the channel piece 19, telescopically within the tubular strut 18, while the strut 18 remains in a horizontal position, until the inner end of the piece 19 is in contact with the bracket 20, when upon the continued movement of the chain 27, the bracket 20, with its attached strut 18, will move downward, following the inner guiding walls of the arm 4, until some such position is reached as shown by the broken lines, wherein the arm 4 assumes the position 4ᵃ, the lever 14, the position 14ᵃ, the guiding arm 13, the position 13ᵃ, and the ribs 30, 9, and 31, the respective positions 30ᵃ, 9ᵃ, and 31ᵃ. The bands 33 fall limp into the position 33ᵃ, 33 being fixed to the body 1.

Upon the continued movement of the chain 27, until the bracket 20 has reached the wheel 5, the parts of the frame come to rest, folded together, upon the hook 3, as shown by the dotted position of the parts having the letter b affixed to the numbers respectively representing said parts as originally numbered for the full open position thereof.

Upon turning the wheel 5, by the wrench 34, counter clock-wise, the frame parts assisted by the separating spring 18ᶜ, reverse the cycle of their folding operation just described and assume the full open position shown in Fig. 1, in full lines.

It is important to work out the proper lengths of the various parts, as well as the positioning of the pivot or journaling points, so that the parts will properly fold together as well as assume the desired full open position, which when reached, should be strengthened by anchoring the front of the frame to the wind shield 29; releasing the same when about to lower the frame.

The plate 2, as well as the hook 3, can be made portable so as to be easily attached or detached from the body 1, enabling the user to put the top frame on or off, as desired, as well as enabling him to fit the said frame to his auto body without employing skilled labor.

Modifications may be made in the frame from that illustrated and described without departing from the spirit and scope of my invention, hence I do not wish to be confined to the exact construction involved in detail in this specification.

Having described my invention, I claim,

1. In a top frame adapted to be attached to a body of a vehicle and affording means for supporting a covering to said body, the combination with said body, of a set of jointed members pivoted thereto, said set of jointed members including a main arm pivoted to said body, a guiding arm pivoted to said body at a point spaced from the pivot point of said main arm, a traveling member in sliding engagement with said main arm, a projecting member pivoted to said traveling member, a lever pivoted to said guiding arm, to said main arm and to said projecting member, and means for moving said traveling member along said main arm, whereby the angular relation of said arms, said lever and said projecting member may be changed.

2. In a top frame adapted to be attached to the body of a vehicle and affording means for supporting a covering to said body, the combination with said body, of two sets of jointed members spaced and pivoted on said body, connecting means joining said sets of jointed members, each of said sets of jointed members including a main arm pivoted to said body, a guiding arm pivoted to said body at another point to that at which said main arm is pivoted, a traveling member in sliding engagement with said main arm, a projecting member pivoted to said traveling member, a lever pivoted to said guiding arm, to said main arm and to said projecting member, operating means for moving said traveling member along said main arm, and transmission means operatively connecting said operating means in each of said sets of jointed members, to cause said sets of members to move simultaneously, upon a movement of either of said traveling means.

3. In a top frame adapted to be attached to a body of a vehicle and affording means for supporting a covering thereon, the combination with said body, of a set of jointed members pivoted thereto, said set of members including a tubular arm pivoted to said body, a guiding arm pivoted to said body, but at a point spaced from the pivot point of said tubular arm, a traveling member in sliding engagement within said tubular arm, a projecting member pivoted to said traveling member, a lever pivoted to said tubular arm, to said guiding arm and to said projecting member, and means for moving said traveling member along said tubular arm, whereby the angular relation of said jointed members to one another may be changed.

4. In a top frame adapted to be attached to a body and affording means for supporting a covering to said body, the combination with said body, of a set of jointed members pivoted thereto, said members including a main arm pivoted to said body, a guiding arm pivoted to said body at a different point thereon from the pivot point of said main arm, a traveling member in sliding engagement with said main arm, a projecting member pivoted to said traveling member, an extension member in sliding engagement with said projecting member adapted to increase the effective cover-supporting length of said projecting member, a lever in pivotal engagement with said main arm, said guiding arm and said projecting member, and means for moving said traveling member along said main arm for changing the angular relation of said jointed members to one another.

5. In a top frame adapted for attachment to a body and affording means for supporting a covering to said body, the combination with said body, of a set of jointed members, including a tubular arm pivoted to said body, a guiding arm pivoted to said body at a point spaced from the pivotal point of said main arm, a traveling member slidable within said tubular arm, a tubular projecting member pivoted to said traveling member, an extension member in sliding engagement with said projecting member, a lever in pivotal engagement with said arms and said projecting member, means for moving said extension member along said projecting member, and other means for operating the said last-mentioned means, and for moving said traveling member along its main arm, whereby the angular relation of said jointed members may be changed relative to one another.

6. In a top frame adapted to be attached to a body and affording means for supporting a covering to said body, the combination with said body, of a set of jointed members including a hollow main arm pivoted to said body, a hollow forwardly extending member, traveling means in sliding engagement within said main arm and connected with said forwardly extending member to support the latter with relation to the said main arm, another arm pivoted to the said body, the pivot points of said arms on said body being spaced, a lever pivoted to said arms and to said extension member at points remote from the pivotal connection of said arms with said body, a pulley on said forwardly extending member, a cable operating in said hollow arm and in said hollow forwardly extending member and having sliding engagement with said traveling means, an extension piece in sliding engagement with said hollow forwardly extending member and attached to said cable, said cable being passed around said pulley, and means for operating said cable, whereby the traveling means in connection with said lever and said arms causes an angular movement between said forwardly extending member and said main arm, and between said arms and said body, while going from a collapsed to an upright position of said arm with respect to said body and also causes a sliding movement of said extension piece along said extension member during the upright position of said main arm with respect to said body.

7. In a top frame adapted to be attached to a body and affording means for supporting a covering to said body, the combination with said body, of a set of jointed members including a main arm pivoted to said body, a guiding arm pivoted to said body at a point spaced from the pivot point of said main arm, a traveling member in sliding engagement with said main arm, a projecting member pivoted to said traveling member, a lever pivoted to said arms and to said projecting member, an extension member in sliding engagement with said projecting member, two sprocket wheels spaced and journaled on said main arm, a roller journaled on said projecting member, guiding rollers on said traveling member, an endless chain in engagement with said wheels and having a portion thereof engaging said rollers and attached to said extension member, and means for turning said sprocket wheel, whereby the angular relation of said jointed members is changed relative to one another and said extension member is moved with respect to said projecting member.

8. In a top frame adapted to be attached to a body of a vehicle and affording means for supporting a covering to said body, a set of jointed members pivoted to the body comprising a main arm pivoted to the body, a guiding arm pivoted to the body, the pivots of said arms being spaced, a projecting member mounted for sliding and swinging movement with relation to said main arm, a lever pivoted to said arms and to said projecting member, and means for raising and lowering the top frame.

9. In a top frame for a vehicle body affording means for supporting a covering thereon, a set of jointed members including a tubular main arm pivoted to said body, a guiding arm pivoted to said body, the pivots of said arms being spaced, a traveling member slidable in said main arm, a tubular projecting member pivoted to said traveling member, a lever pivoted to said guiding arm, to said main arm and to said projecting member, an extension slidable in said projecting member, an operating element operating in said main arm and in said projecting member and having operative connection with said extension and with said traveling member, and means for operating said operating element, whereby upon operation of said operating element the top may be raised and lowered.

Buffalo, N. Y., March 8, 1916.

EDWARD L. KUNZ.

Witnesses:
A. L. ALLING,
W. D. GROVE.

Copies of this patent may be obtained for five cents each, by addressing the "Commissioner of Patents, Washington, D. C."